US012737840B2

(12) United States Patent
Rajasankar et al.

(10) Patent No.: US 12,737,840 B2
(45) Date of Patent: Sep. 15, 2026

(54) REALTIME VIDEO SUPER RESOLUTION USING MOTION VECTORS

(71) Applicant: MICROSOFT TECHNOLOGY LICENSING, LLC, Redmond, WA (US)

(72) Inventors: Sushanth Rajasankar, Redmond, WA (US); Rafael V. Cintron, Redmond, WA (US); Frank Kam-Chuen Li, Snoqualmie, WA (US)

(73) Assignee: MICROSOFT TECHNOLOGY LICENSING, LLC, Redmonds, WA (US)

( * ) Notice: Subject to any disclaimer, the term of this patent is extended or adjusted under 35 U.S.C. 154(b) by 627 days.

(21) Appl. No.: 18/106,922

(22) Filed: Feb. 7, 2023

(65) Prior Publication Data

US 2024/0265494 A1 Aug. 8, 2024

(51) Int. Cl.
*G06T 3/4053* (2024.01)
*G06T 5/70* (2024.01)
(Continued)

(52) U.S. Cl.
CPC .............. *G06T 3/4053* (2013.01); *G06T 5/70* (2024.01); *G06T 7/223* (2017.01); *G06T 7/248* (2017.01);
(Continued)

(58) Field of Classification Search
CPC ......... G06T 3/4053; G06T 5/70; G06T 7/223; G06T 7/248; G06T 7/90;
(Continued)

(56) References Cited

U.S. PATENT DOCUMENTS 8,208,065 B2 6/2012 Sharlet et al.
11,240,465 B2 2/2022 Qin et al.
(Continued)

FOREIGN PATENT DOCUMENTS

WO 2013131929 A1 9/2013
WO 2020146911 A2 7/2020
WO 2022088970 A1 5/2022

OTHER PUBLICATIONS

International Search Report and Written Opinion received for PCT Application No. PCT/US2024/013632, May 28, 2024, 14 pages.
(Continued)

*Primary Examiner* — Chan S Park
*Assistant Examiner* — Daniel C Chang
(74) *Attorney, Agent, or Firm* — Han Gim; Newport IP, LLC

(57) ABSTRACT

A low resolution image frame is received. A past reference low resolution image frame and its super resolution result are retained. Motion vectors between the input low resolution image frame and reference low resolution frame are computed. For each pixel in the low resolution image frame, a reference pixel is determined based on the computed motion vectors and the reference low resolution frame. If the reference pixel equals the corresponding input pixel, the reference super resolution result pixel is rendered for this pixel, and otherwise a corresponding pixel from the current input frame is rendered.

20 Claims, 7 Drawing Sheets

(51) Int. Cl.
*G06T 7/223* (2017.01)
*G06T 7/246* (2017.01)
*G06T 7/90* (2017.01)

(52) U.S. Cl.
CPC ...... *G06T 7/90* (2017.01); *G06T 2207/10016* (2013.01); *G06T 2207/20081* (2013.01); *G06T 2207/20182* (2013.01)

(58) Field of Classification Search
CPC . G06T 2207/10016; G06T 2207/20081; G06T 2207/20182
See application file for complete search history.

(56) References Cited

U.S. PATENT DOCUMENTS

| | | | | |
|---|---|---|---|---|
| 2009/0010568 | A1 | 1/2009 | Nakagami | |
| 2009/0232213 | A1 | 9/2009 | Jia | |
| 2012/0093227 | A1* | 4/2012 | Morioka | H04N 19/176<br>375/E7.243 |
| 2022/0092738 | A1 | 3/2022 | Pei et al. | |
| 2022/0245765 | A1 | 8/2022 | Wang et al. | |
| 2023/0057261 | A1* | 2/2023 | Liu | H04N 19/184 |
| 2025/0104186 | A1* | 3/2025 | Cohen | G06N 3/09 |
| 2025/0184499 | A1* | 6/2025 | Li | H04N 19/159 |

OTHER PUBLICATIONS

Takeda, et al., "Super-Resolution Without Explicit Subpixel Motion Estimation", IEEE Transactions on Image Processing, vol. 18, Issue No. 9, Sep. 2009, pp. 1958-1975.

Hu, et al., "Real Time Super Resolution Reconstruction for Video Stream Based on GPU", In International Conference on Orange Technologies, Sep. 20, 2014, pp. 9-12.

Marenzi, et al., "Efficient Parallelization of Motion Estimation for Super-Resolution", In Proceedings of 25th Euromicro International Conference on Parallel, Distributed and Network-based Processing, Mar. 6, 2017, pp. 274-277.

Thiyagalingam, et al., "On the Usage of GPUs for Efficient Motion Estimation in Medical Image Sequences", In International Journal of Biomedical Imaging, Aug. 18, 2011, 15 Pages.

Tidd, Randy, "New in D3D12—Motion Estimation", Retrieved From: https://devblogs.microsoft.com/directx/new-in-d3d12-motion-estimation/, Jul. 9, 2019, 5 Pages.

International Preliminary Report on Patentability Received for PCT Application No. PCT/US2024/013632, mailed on Aug. 21, 2025, 08 pages.

Communication under Rule 94(3) Received for European Application No. 24710257.7, mailed on May 13, 2026, 07 pages.

* cited by examiner

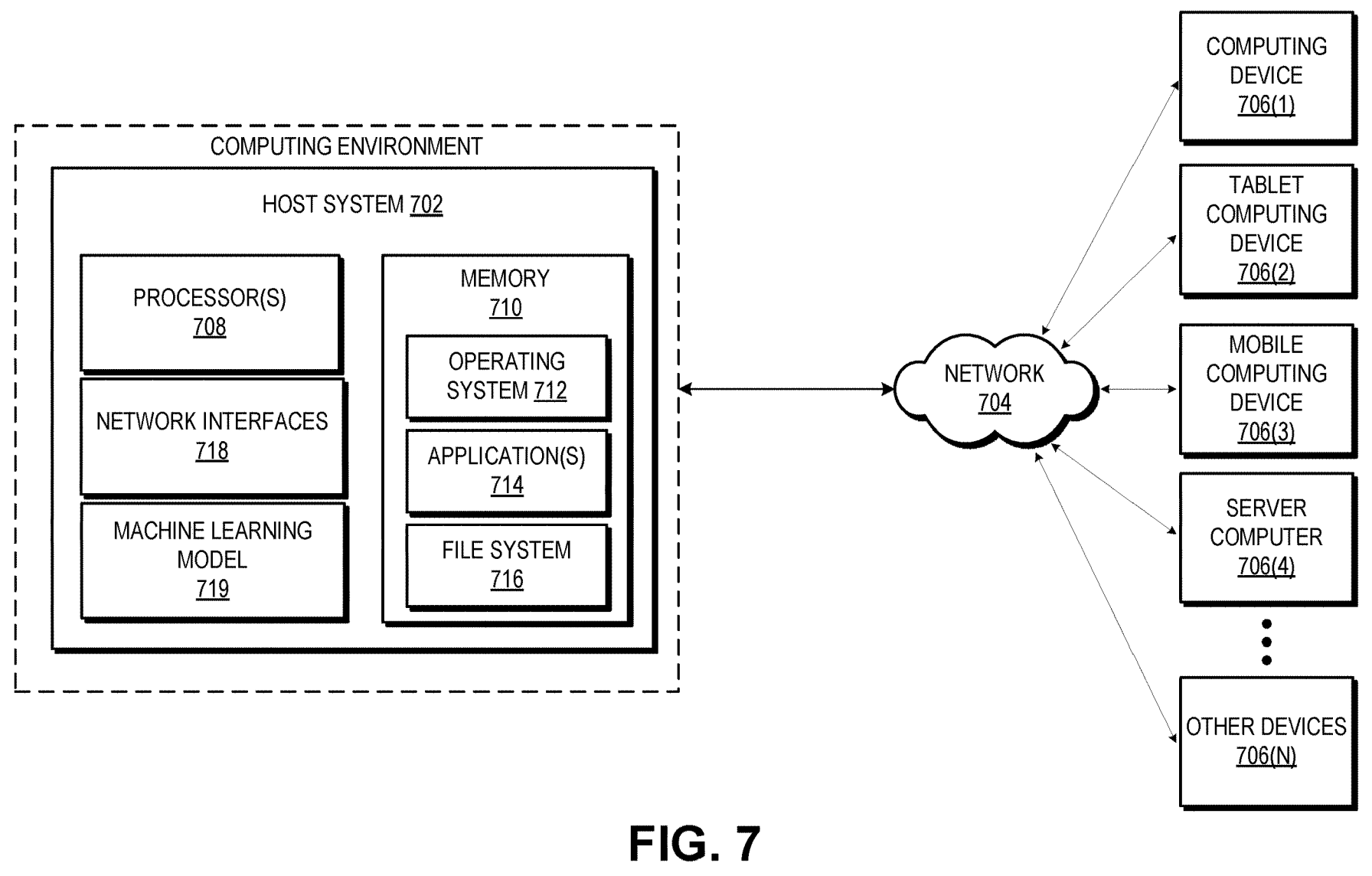

COMPUTING DEVICE 706(1)

TABLET COMPUTING DEVICE 706(2)

MOBILE COMPUTING DEVICE 706(3)

SERVER COMPUTER 706(4)

• • •

OTHER DEVICES 706(N)

NETWORK 704

COMPUTING ENVIRONMENT

HOST SYSTEM 702

MEMORY 710

OPERATING SYSTEM 712

APPLICATION(S) 714

FILE SYSTEM 716

PROCESSOR(S) 708

NETWORK INTERFACES 718

MACHINE LEARNING MODEL 719

FIG. 7

REALTIME VIDEO SUPER RESOLUTION USING MOTION VECTORS

BACKGROUND

Machine learning (ML) is increasingly being utilized to perform a variety of tasks in various environments where patterns and inferences may be used in place of explicit programming. Image super resolution is a computing intensive technique for upscaling images using ML models to produce higher fidelity images on client devices. When extending image super resolution to videos, so that client devices can upscale, for example, 360p video to 1080p video, one issue that can arise is that performance of such ML models are too slow to allow for the generation of real time video super resolution.

It is with respect to these considerations and others that the disclosure made herein is presented.

SUMMARY

Methods and systems are disclosed for implementing real time video super resolution. Video super resolution is generally a process for generating high-resolution video frames from low-resolution frames. In various embodiments, the disclosed super resolution process includes inputting a low resolution frame, a reference low resolution frame, and a reference super resolution result, and outputting a super resolution frame. Current machine learning video super resolution techniques attempt to achieve higher performance by reducing the model size. However, such techniques can produce lower quality super resolution results. Pure machine learning inferencing is not able to render, for example, 480P videos at 60 frames per second (FPS), while the disclosed techniques make it possible to obtain super resolution 720p or 1080p video based on low resolution frames. In one embodiment, motion vectors between the input low resolution frame and the reference low resolution frame are computed. For each pixel in the input low resolution frame, a reference pixel is determined based on the computed motion vectors and the reference low resolution frame. If the reference pixel equals the corresponding input pixel, the reference super resolution result pixel is rendered for this pixel, otherwise a corresponding pixel from the current input frame is rendered.

This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

FIG. 7 is a data architecture diagram showing an illustrative example of a computer environment.

DETAILED DESCRIPTION

Figure 1:
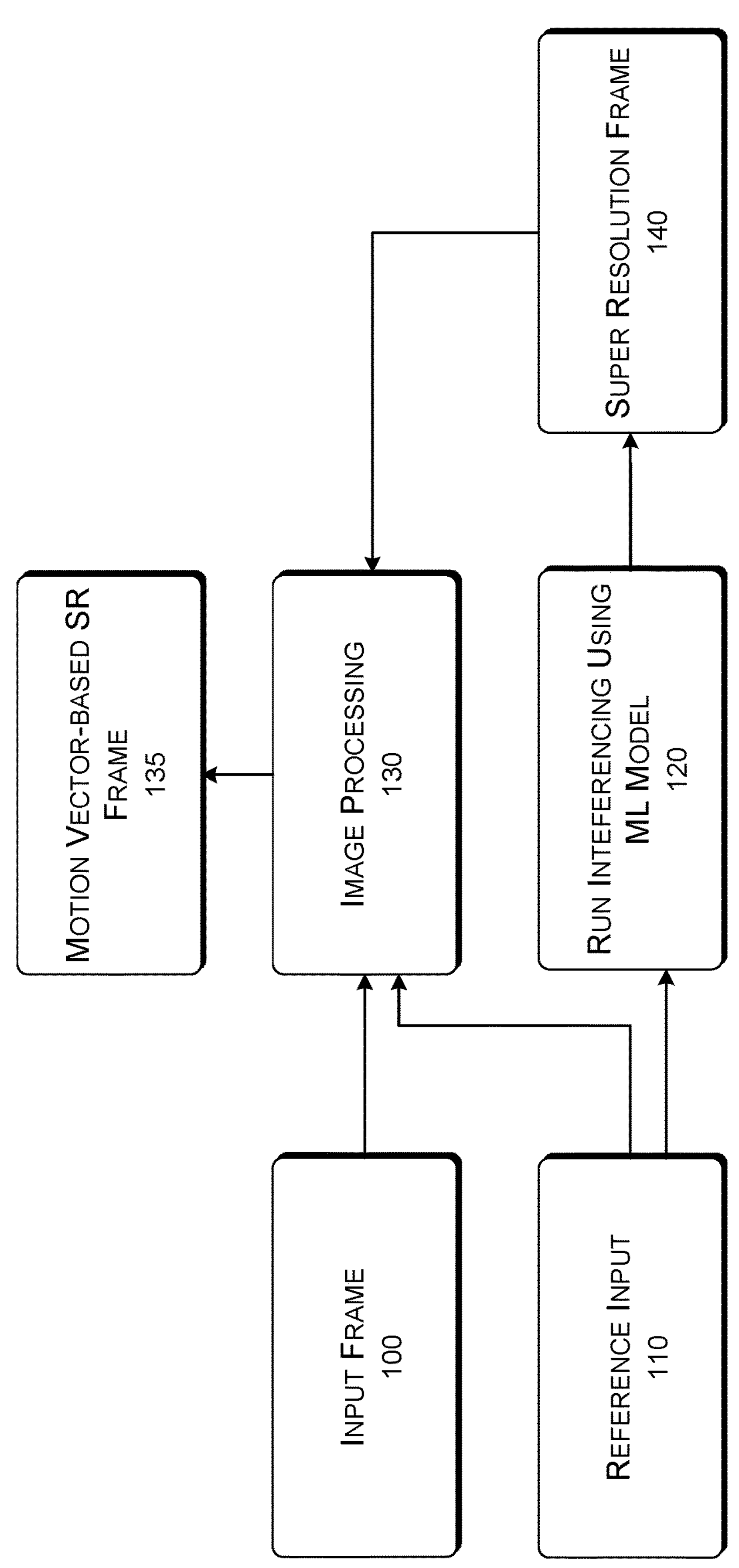
FIG. 1 is a diagram illustrating the disclosed techniques according to one embodiment disclosed herein.

Referring to the appended drawings, in which like numerals represent like elements throughout the several FIGURES, aspects of various technologies for video super resolution using motion vectors will be described. In the following detailed description, references are made to the accompanying drawings that form a part hereof, and which are shown by way of illustration specific configurations or examples.

Image super resolution is a computing intensive technique for upscaling images using machine learning models to produce higher fidelity images. In some embodiments, inferencing graphics processing units (GPUs) or neural processing units (NPUs) are used to accelerate the processing. When extending image super resolution to videos, so that client devices can upscale, for example, from 360p videos to 1080p videos, one issue that can arise is that performance of such machine learning models are too slow to allow for real time video super resolution.

For example, GPU inferencing time needs to be under 16 ms in order to render 60 FPS videos in real time. ML models can be optimized at the cost of super resolution inference quality, but there are limits to how far ML optimization can be continued before the results begin to degrade and only match simple bicubic interpolation such that the cost of continued optimization is not beneficial.

In order to perform less work per frame and allow for faster processing, work can be reused either across space or time or both. Some video encoders are configured to perform such reuse operations. For example, video encoders may segment a video into tiles, mark certain frames as key frames, and compute position deltas between these tiles, i.e., identify where the tiles in the current frame are in the keyframe and then encode both the position delta vector (motion vectors) for the tile and the absolute pixel difference after displacement.

If software video decoders for common video codecs are modified to run super resolution on just the keyframes, and the decoders play back the motion vectors/tile deltas on top of these super resolution keyframes, the result would be an output of mostly super resolution output frames without super resolution being applied to every frame. However, updates would have to be made to every video codec, which would mean that client devices would have to incorporate software video decoding to implement such techniques.

Alternatively, many modern GPUs expose functionality to recompute motion vectors between video frames. Many operating systems expose a public application programming interface (API) to use this functionality. For example, DirectX 12 exposes hardware encoder functionality in GPUs to compute motion vectors. Thus, without relying on information from video codecs, it is possible to recompute motion vectors post, or after hardware video decoding across any codec, by leveraging such GPU functionality.

Using the above-described GPU-based method of computing motion vectors, the present disclosure provides a way to generate real time video super resolution with the following algorithm:

Algorithm: Motion Vector Super Resolution

```
Input: Input Low Resolution Frame,
Reference Low Resolution Frame,
Reference Super Resolution Result (140)
Output: Super Resolution Frame
if there is no Reference Super Resolution Result:
  present the entire Input Low Resolution Frame as is.
if there is a Reference Super Resolution Result:
  compute motion vectors between (Input Low Resolution
  Frame, Reference
  Low Resolution Frame) as motion_vectors [width, height]
  for each pixel (x,y) in the Input Low Resolution Frame:
    reference_pixel = read from Reference Frame (x -
  motion_vectors[x], y - motion_vectors[y])
    if reference_pixel ~= input pixel (x,y)
      render Reference Super Resolution Result (x -
    motion_vectors[x], y - motion_vectors[y]) for this pixel.
    else
      render input pixel (x,y) for this pixel.
```

Schedule an update Reference Super Resolution Request for the current input by running the full machine learning model. The determination of reference_pixel~=input pixel (x,y) may be based on a threshold. The threshold can be a positional threshold, for example, a distance threshold. When the threshold is met, the reference pixel may be said to match the input pixel, or that the reference pixel equals or is equivalent to the input pixel. The Reference Super Resolution Result can be, for example, the upscaled image of the Reference Low Resolution Frame using a machine learning model.

FIG. 1 illustrates an example of the disclosed techniques. Input Frame 100 is an Input Low Resolution Frame and Reference Input 110 is a Reference Low Resolution Frame. Input Frame 100 and Reference Input 110 are inputs for Image Processing 130. Inferencing is performed 120 as described above, and a Super Resolution Frame is output 140. Image processing 130 is performed using the Input Frame 100, Reference Input 110 and the Super Resolution Frame 140 to output a Motion Vector-Based Super Resolution (SR) Frame 135.

The disclosed embodiments enable the rendering of a video frame with a mix of super resolution pixels and pixels from the current input when the blending of super resolution pixels with input pixels can be performed with acceptable latency and acceptable perceptible visual degradation compared to full super resolution. Current machine learning video super resolution techniques attempt to achieve performance by reducing model size at the expense of lower quality super resolution results. Pure machine learning inferencing is not able to render 480P videos at 60 FPS, while the disclosed embodiments make it possible to generate super resolution 720p or 1080p videos.

In some embodiments, additional improvements can be implemented with regard to visual quality pertaining to motion vector super resolution when compared to pure inferencing. The improvements include two sources of visual degradation: color disparity and motion vector inaccuracy.

When the output of motion vector based super resolution is scaled, artifacts can begin to appear. One type of artifact results from the model having learned color correction techniques that change the colors of the reference super resolution image compared to the reference input image. These color corrections are akin to automatic contrast correction that enhances video frames by increasing dynamic range.

In motion vector-based video super resolution, since pixels are mixed from raw input with pixels that have gone through the model, the color disparity between the two types of pixels can appear as patches in the final frame. In order to handle this color disparity, in an embodiment, the model's behavior can be quantified and replicated on the non-super resolution pixels. The model's color correction can be a spatial function of where the pixel is in the image (e.g., the pixel can be close to an edge), a side effect of a contrast/sharpening kernel, or a function of the color itself.

In one embodiment, a color lookup table is learned from the results of a pure inference. For every generated reference super resolution image, each pixel is processed in a compute shader on the GPU. The input image is compared to the output super resolution image color for the same pixel, the differences are aggregated, and the count is stored in a buffer indexed by a 15 bit key computed from the input pixel's color. It should be noted that the key size may vary. The average color difference for each color bucket is computed. The following provides an example implementation:

```
uint ComputeColorKey(float r, float g, float b) {
  // 5 Bits only per channel
  uint r_comp = 0x1F & ((uint)floor(r * 31.0));
  uint g_comp = 0x1F & ((uint)floor(g * 31.0));
  uint b_comp = 0x1F & ((uint)floor(b * 31.0));
  // 15 bit key
  uint key = r_comp << 10 | g_comp << 5 | b_comp;
  return key;
}
void ColorMap( )
{
  ...
  uint key = ComputeColorKey(input_pixel.r, input_pixel.g,
  input_pixel.b);
  uint current_value;
  InterlockedAdd(color_map_c[key], 1, current_value);
  input_pixel = input_pixel * 255.0;
  input_sr_pixel = input_sr_pixel * 255.0;
  int r_val = round(input_sr_pixel.r - input_pixel.r);
  int g_val = round(input_sr_pixel.g - input_pixel.g);
  int b_val = round(input_sr_pixel.b - input_pixel.b);
  InterlockedAdd(color_map_r[key], r_val, current_value);
  InterlockedAdd(color_map_g[key], g_val, current_value);
  InterlockedAdd(color_map_b[key], b_val, current_value);
}
```

In an embodiment, four individual buffers are used instead of one buffer indexed by a key, so that multiple cores can process the buffers in parallel. During motion vector based super resolution, the same color delta is applied back to input pixels as that which was used when super resolution pixels are not available for a region of the frame.

Another source of artifacts in motion vector-based video super resolution is due to inaccuracies in the motion vector. In one example, the motion vector computation process operates by convolving each 8×8 patch of the frame over an 8×8 region with ¼th pixel offset steps. The best resulting offset is reported as the motion offset for that 8×8 block. Motion vectors handle both motion of objects in the scene and the camera itself.

Motion vectors in a video encoding application are intended to be used with a pipeline that encodes the deltas between the suggested tile offset and the pixels in that actual tile position. It is expected that they are not a perfect match. Some reasons for incomplete matches include:

- The motion vector is a 2D translation, whereas the real scene is undergoing a 3D transformation, such as rotation of the camera. The 2D translation is a rough approximation of the original transformation for the small 8×8 patch.

Some operations, such as a zoom-in to the scene, may not have consistent offsets for each pixel in the tile. Some of these operations can expose hidden parts of a scene due to parallax effects.

Entirely new objects can be introduced to a scene, or objects can change color, such as a traffic light. These changes cannot be represented as a motion vector.

Given that the pixels are not a complete match, a determination is made with the given data, to either select the input pixel or the super resolution pixel from the reference frame, which may be referred to as a pure reference frame. In one embodiment, using a method that can be referred to as block matching, a threshold is adapted based on the overall quality of a block. This threshold may be referred to as a pixel acceptance threshold. As an output of this step, an image is generated with values between 0 to 1, that indicate:

0—use the current input pixels, 1—use the reference super resolution pixels.

In an embodiment, the following process can be performed to determine whether to select the input pixel or the super resolution pixel from the reference frame, and to blur transitions between super resolution pixels and input low resolution pixels:

Step 1—Compute the Sum of Absolute Pixel Differences (SAD) between motion adjusted reference input and current input for a motion vector block of 8×8 or 4×4 pixels. This sum can be considered a quality of motion vector value.

Step 2—If the SAD value is below the threshold, accept the super resolution results for that block as is.

Step 3—If the SAD value is above the threshold, compare each pixel and accept those that are below a separate pixel comparison threshold.

Step 4—Apply a Gaussian smoothing operator or filter to blur the transition from super resolution pixels to raw input pixels.

Figure 2:
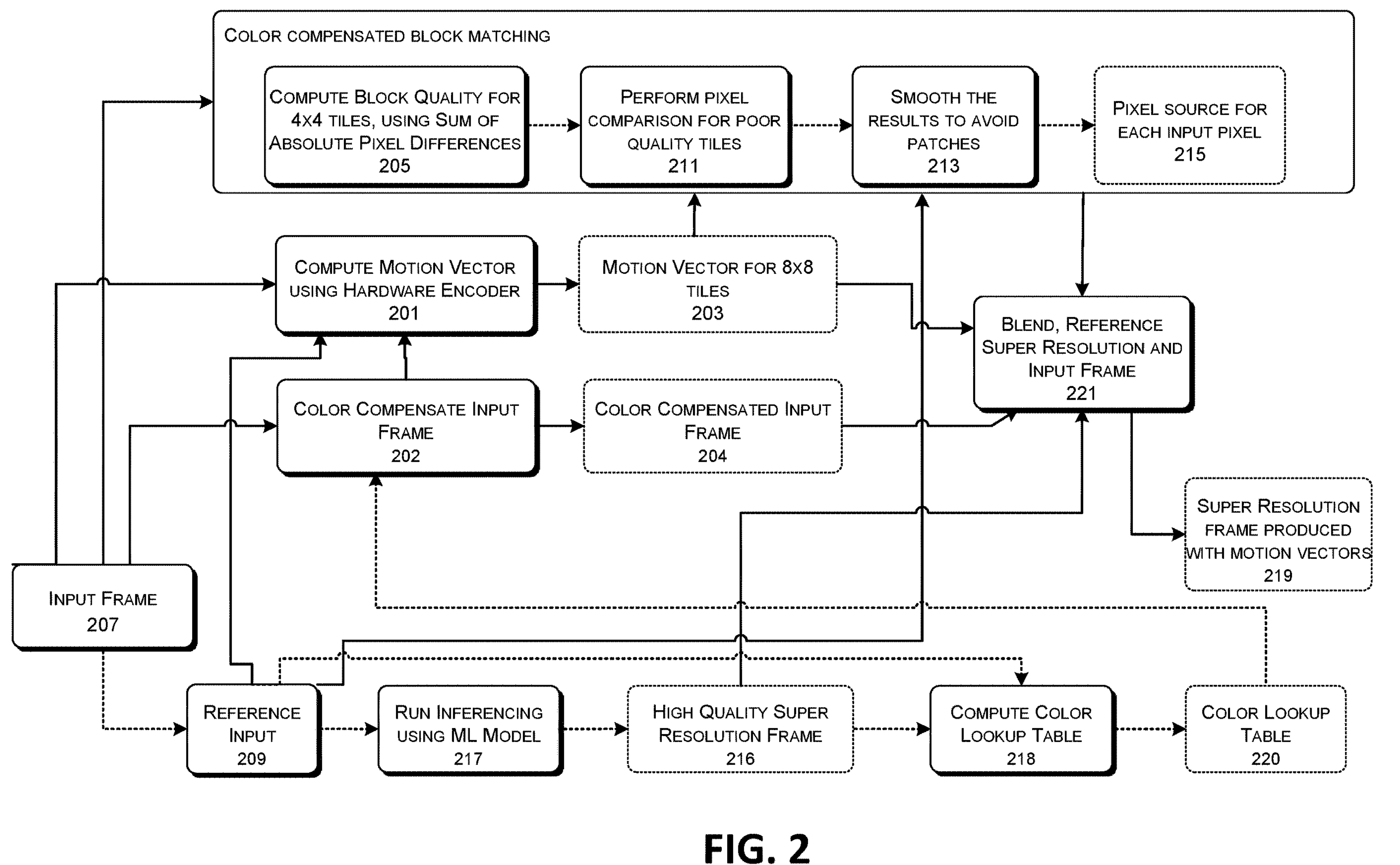
FIG. 2 is a diagram illustrating the disclosed techniques according to one embodiment disclosed herein.

FIG. 2 illustrates a functional diagram showing the disclosed techniques. In an embodiment, solid arrows in the figure are run at high priority, and the dotted arrows run opportunistically at a lower priority/frame rate. The dotted boxes indicate intermediate results. The solid boxes indicate processes. Box 201 illustrates computing motion vectors using a hardware encoder to generate motion vectors for 8×8 tiles 203. Box 202 illustrates color compensation of the input frame 207 to generate color compensated input frame 204. Box 217 illustrates running inferencing using the ML model based on the reference input 209. A color lookup table is computed in box 218 using the high quality super resolution frame 216 and reference input 209, to produce color lookup table 220. Box 221 illustrates blending of the reference super resolution frame 216 and color compensated input frame 204 and outputting a super resolution frame produced with motion vectors 219. Color compensated block matching includes computing block quality for 4×4 tiles using sum of absolute pixel differences 205, performing pixel comparison for poor quality tiles 211, and smoothing the results to avoid patches 213 to output the pixel source for each input pixel 215.

Figure 3:
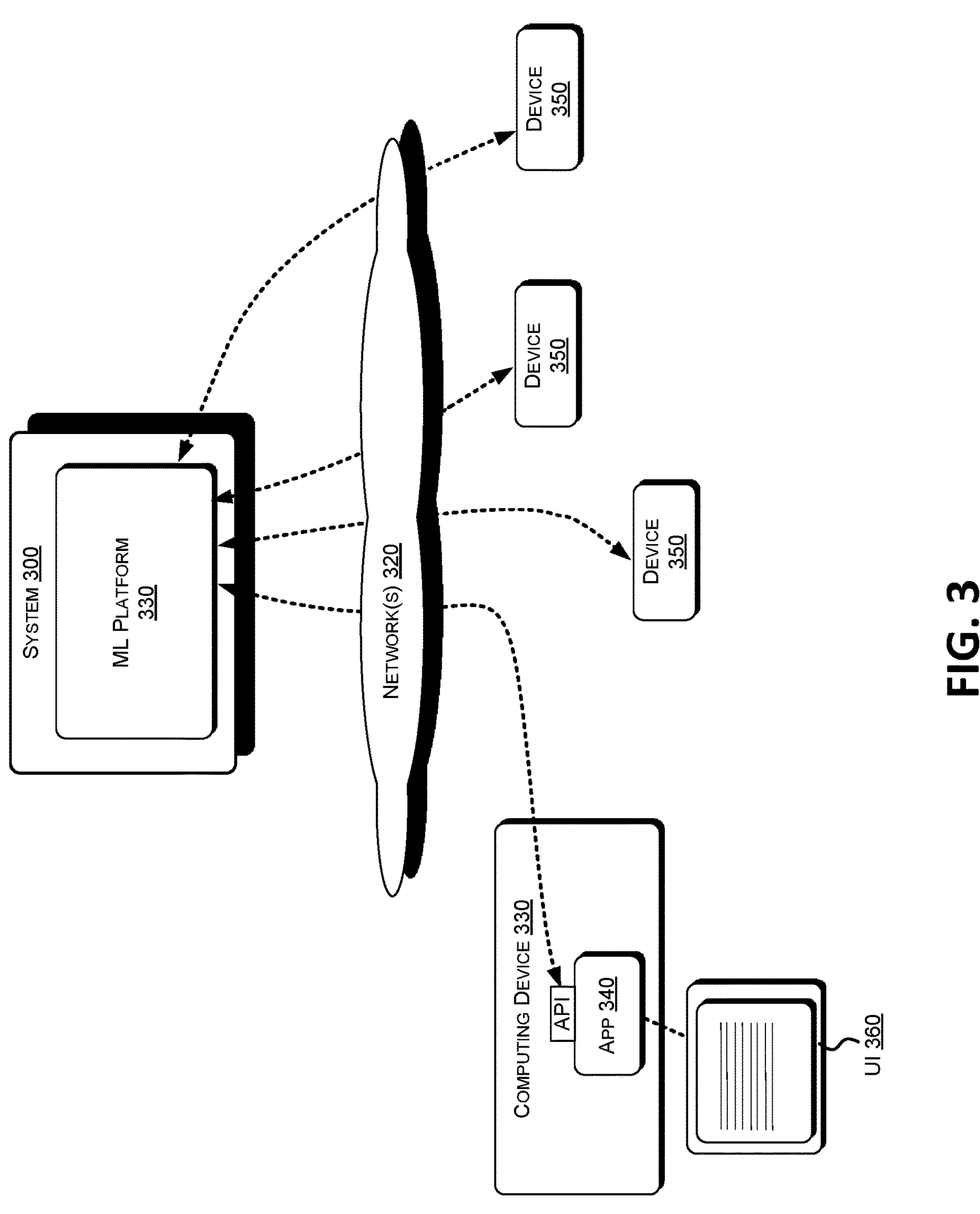
FIG. 3 is a diagram showing aspects of an example system according to one embodiment disclosed herein.

In various embodiments, the machine learning model(s) may be run locally on the client. In other embodiments, the machine learning inferencing can be performed on a server of a network. For example, in the system illustrated in FIG. 3, a system 300 is illustrated that implements ML platform 330. The ML platform 330 may be configured to provide output data to various devices 350 over a network 320, as well as computing device 330. A user interface 360 may be rendered on computing device 330. The user interface 360 may be provided in conjunction with an application 340 that communicates to the ML platform 330 using an API via network 320. In some embodiments, system 300 may be configured to provide product information to users. In one example, ML platform 330 may implement a machine learning system to perform one or more tasks. The ML platform 330 utilizes the machine learning system to perform tasks such as image and writing recognition. The machine learning system may be configured to be optimized using the techniques described herein.

Figure 4:
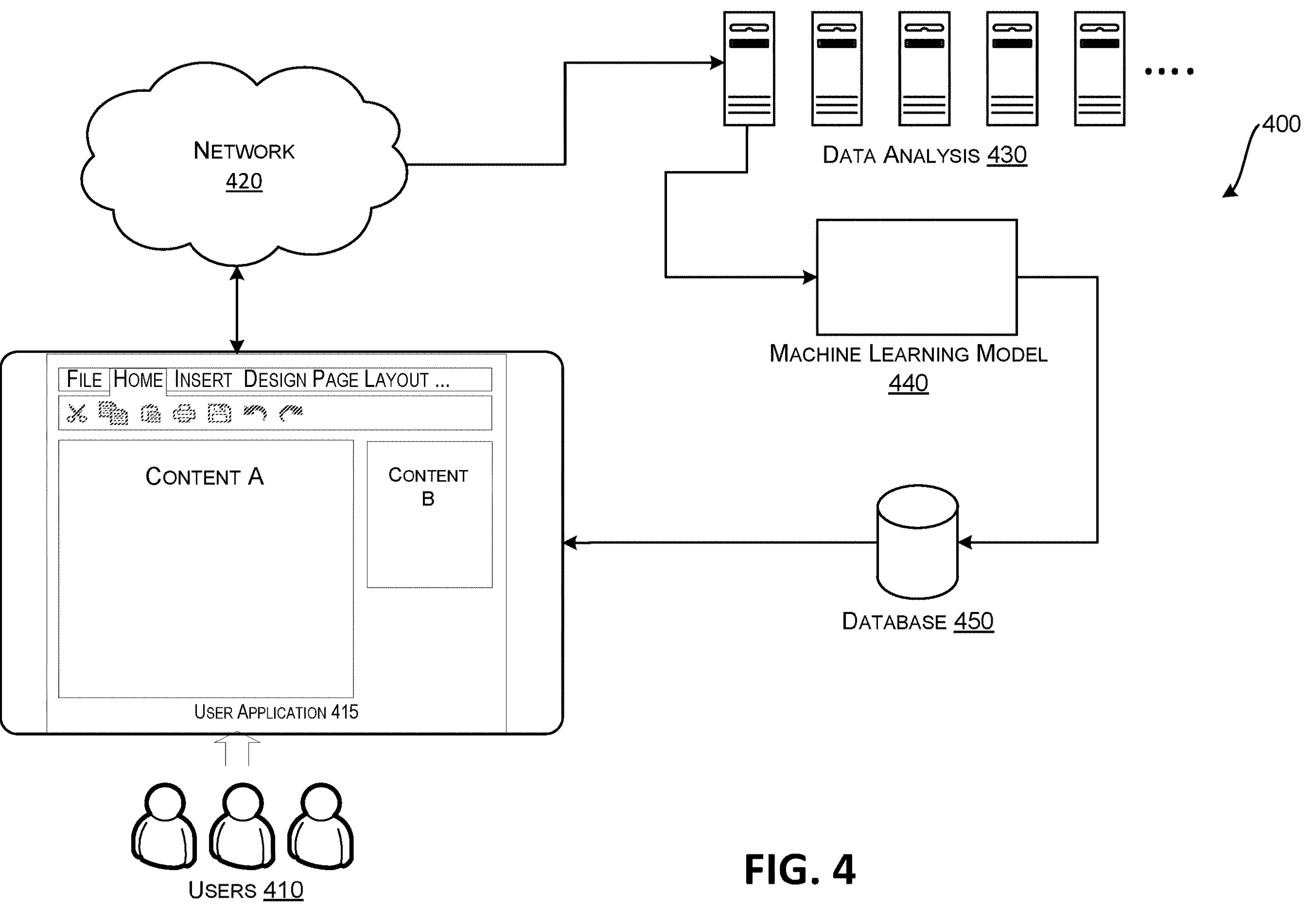
FIG. 4 is a diagram showing aspects of an example system according to one embodiment disclosed herein.

FIG. 4 is a computing system architecture diagram showing an overview of a system disclosed herein for implementing a machine learning model, according to one embodiment disclosed herein. As shown in FIG. 4, a machine learning system 400 may be configured to perform analysis and perform identification, prediction, or other functions based upon various data collected by and processed by data analysis components 430 (which might be referred to individually as an "data analysis component 430" or collectively as the "data analysis components 430"). The data analysis components 430 may, for example, include, but are not limited to, physical computing devices such as server computers or other types of hosts, associated hardware components (e.g., memory and mass storage devices), and networking components (e.g., routers, switches, and cables). The data analysis components 430 can also include software, such as operating systems, applications, and containers, network services, virtual components, such as virtual disks, virtual networks, and virtual machines. Database 450 can include data, such as a database, or a database shard (i.e., a partition of a database). Feedback may be used to further update various parameters that are used by machine learning model 420. Data may be provided to the user application 415 to provide results to various users 410 using a user application 415. In some configurations, machine learning model 420 may be configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

Figure 5:
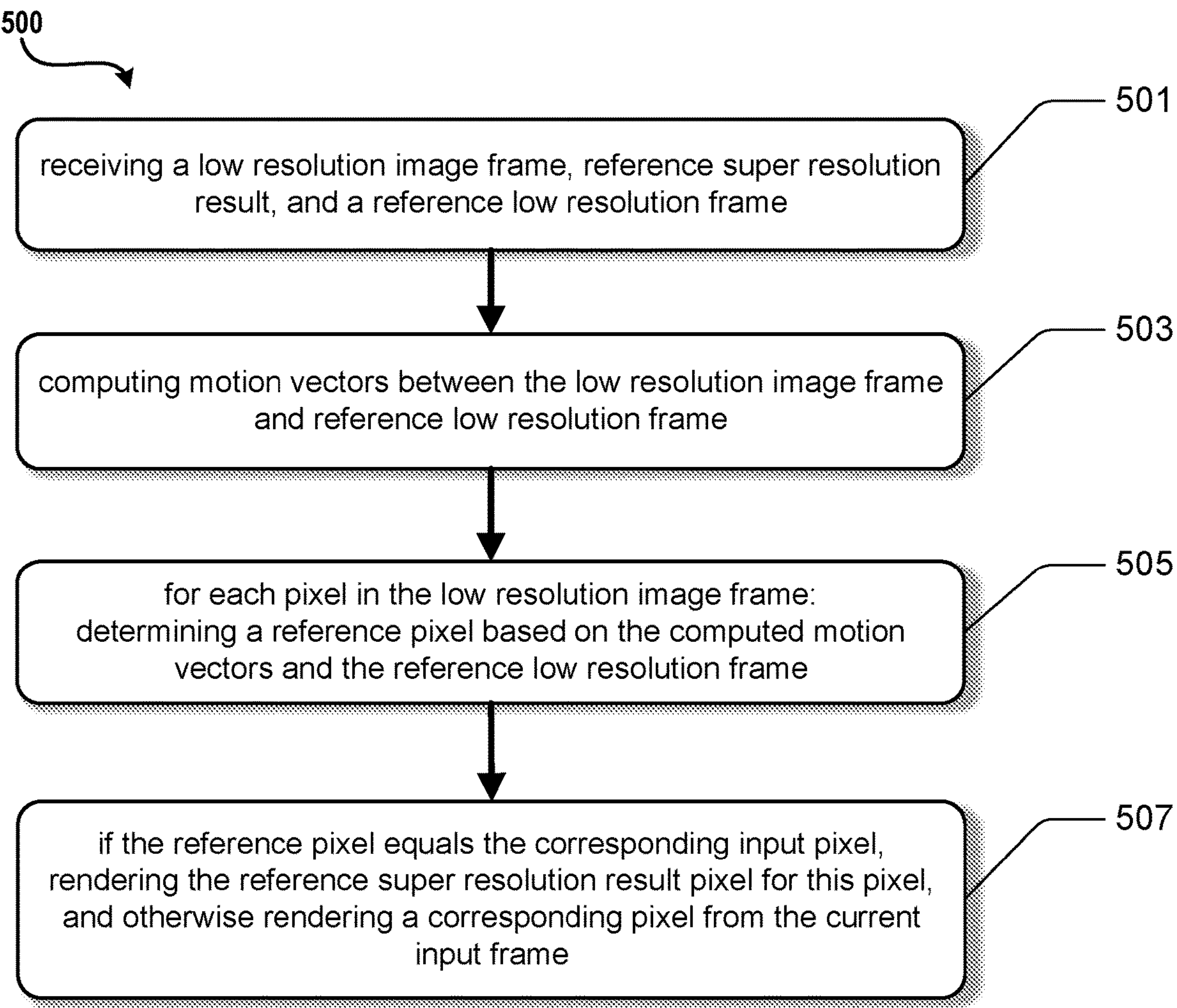
FIG. 5 is a flow diagram showing aspects of an illustrative routine, according to one embodiment disclosed herein.

Turning now to FIG. 5, illustrated is an example operational procedure for generating images in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 501 illustrates receiving, by a computing system, a low resolution image frame as a current input frame, a reference super resolution result, and a reference low resolution frame.

Operation 501 may be followed by operation 503. Operation 503 illustrates computing motion vectors between the low resolution image frame and reference low resolution frame.

Operation 503 may be followed by operation 505. Operation 505 illustrates for each pixel in the low resolution image frame, determining a reference pixel based on the computed motion vectors and the reference low resolution frame.

Operation 505 may be followed by operation 507. Operation 507 illustrates for each pixel in the low resolution image frame, if the reference pixel equals a corresponding input pixel, rendering a reference super resolution result pixel for this pixel, and otherwise rendering a corresponding pixel from the current input frame.

Figure 6:
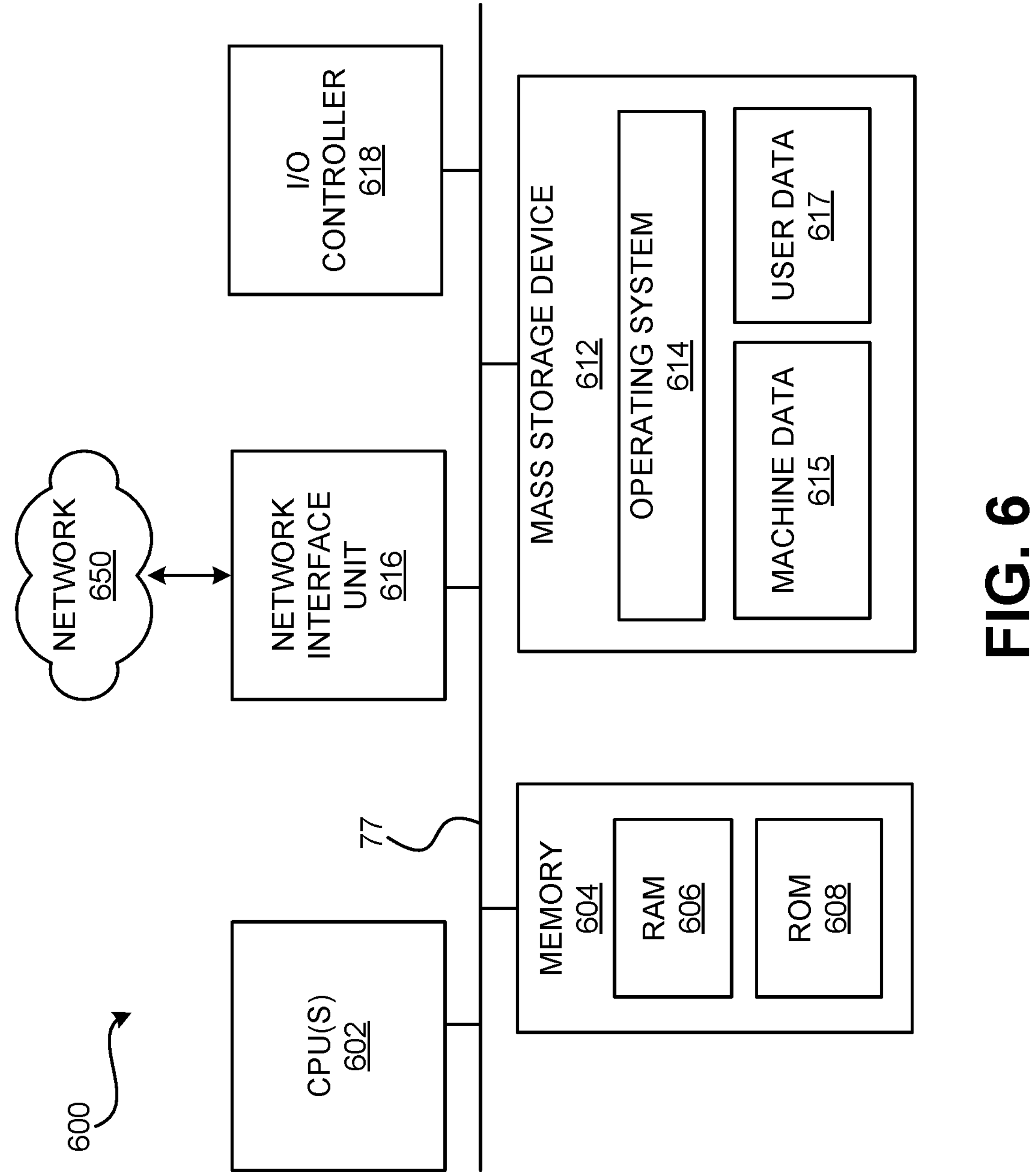
FIG. 6 is a computer architecture diagram illustrating aspects of an example computer architecture for a computer capable of executing the software components described herein.

FIG. 6 shows an example computer architecture for a computer capable of providing the functionality described herein such as, for example, a computing device configured to implement the functionality described above with reference to FIGS. 1-6. Thus, the computer architecture 600 illustrated in FIG. 6 illustrates an architecture for a server computer or another type of computing device suitable for implementing the functionality described herein. The computer architecture 600 might be utilized to execute the various software components presented herein to implement the disclosed technologies.

The computer architecture 600 illustrated in FIG. 6 includes a central processing unit 602 ("CPU"), a system memory 604, including a random-access memory 606 ("RAM") and a read-only memory ("ROM") 608, and a system bus 77 that couples the memory 604 to the CPU 602. A firmware containing basic routines that help to transfer information between elements within the computer architecture 600, such as during startup, is stored in the ROM 608. The computer architecture 600 further includes a mass storage device 612 for storing an operating system 614, other data, such as product data 615 or user data 617.

The mass storage device 612 is connected to the CPU 602 through a mass storage controller (not shown) connected to the bus 77. The mass storage device 612 and its associated computer-readable media provide non-volatile storage for the computer architecture 600. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various implementations, the computer architecture 600 might operate in a networked environment using logical connections to remote computers through a network 650 and/or another network (not shown). A computing device implementing the computer architecture 600 might connect to the network 650 through a network interface unit 616 connected to the bus 77. It should be appreciated that the network interface unit 616 might also be utilized to connect to other types of networks and remote computer systems.

The computer architecture 600 might also include an input/output controller 618 for receiving and processing input from a number of other devices, including a keyboard, mouse, or electronic stylus (not shown in FIG. 6). Similarly, the input/output controller 618 might provide output to a display screen, a printer, or other type of output device (also not shown in FIG. 6).

It should be appreciated that the software components described herein might, when loaded into the CPU 602 and executed, transform the CPU 602 and the overall computer architecture 600 from a general-purpose computing system into a special-purpose computing system customized to facilitate the functionality presented herein. The CPU 602 might be constructed from any number of transistors or other discrete circuit elements, which might individually or collectively assume any number of states. More specifically, the CPU 602 might operate as a finite-state machine, in response to executable instructions contained within the software modules disclosed herein. These computer-executable instructions might transform the CPU 602 by specifying how the CPU 602 transitions between states, thereby transforming the transistors or other discrete hardware elements constituting the CPU 602.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 might include other types of computing devices, including hand-held computers, embedded computer systems, personal digital assistants, and other types of computing devices known to those skilled in the art.

It is also contemplated that the computer architecture 600 might not include all of the components shown in FIG. 6, might include other components that are not explicitly shown in FIG. 6, or might utilize an architecture completely different than that shown in FIG. 6. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

FIG. 7 illustrates an example computing environment capable of executing the techniques and processes described above with respect to FIGS. 1-6. In various examples, the computing environment comprises a host system 702. In various examples, the host system 702 operates on, in communication with, or as part of a network 704.

The network 704 can be or can include various access networks. For example, one or more client devices 706(1) . . . 706(N) can communicate with the host system 702 via the network 704 and/or other connections. The host system 702 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 702 can be provided by one or more servers that are executing as part of, or in communication with, the network 704. A server can host various services, virtual machines, portals, and/or other resources. For example, a can host or provide access to one or more portals, Web sites, and/or other information.

The host system 702 can include processor(s) 708 memory 710. The memory 710 can comprise an operating system 712, application(s) 714, and/or a file system 716. Moreover, the memory 710 can comprise the storage unit(s) 82 described above with respect to FIGS. 1-5.

The processor(s) 708 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 710.

The memory 710 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 702 can communicate over the network 704 via network interfaces 718. The network interfaces 718 can include various types of network hardware and software for supporting communications between two or more devices. The host system 702 may also include machine learning model 719.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method of generating images, the method comprising:

receiving, by a computing system, a low resolution image frame as a current input frame, a reference super resolution result, and a reference low resolution frame;

computing motion vectors between the current input frame and the reference low resolution frame; and for an input pixel in the current input frame:

determining a position of a reference pixel based on the computed motion vectors;

determining that the position of the reference pixel is within a distance threshold of a position of a corresponding input pixel; and based on the determining that the position of the reference pixel is within the distance threshold, rendering a reference super resolution result pixel from the reference super resolution result associated with the input pixel.

Clause 2: The method of clause 1, wherein the input pixel is a first input pixel, further comprising:

for a second input pixel in the current input frame:

determining a second position of a second reference pixel based on the computed motion vectors;

determining that the second position of the second reference pixel is not within the distance threshold of a position of a corresponding second input pixel; and based on the determining that the second position of the second reference pixel is not within the distance threshold, rendering a corresponding pixel from the current input frame.

Clause 3: The method of any of clauses 1-2, wherein a location of the reference pixel is determined as differences between x and y values of each pixel and the computed motion vectors.

Clause 4: The method of any of clauses 1-3, further comprising scheduling a request to update the reference super resolution for the current input by running a machine learning model.

Clause 5: The method of any of clauses 1-4, further comprising:

learning a color look up table from results of a reference frame;

comparing input image and output super resolution image color; and aggregating differences and count per color bucket in order to compute average color difference for each color bucket.

Clause 6: The method of any of clauses 1-5, further comprising applying a same color delta to input pixels when super resolution pixels are not available for a region of the input frame.

Clause 7: The method of clauses 1-6, further comprising:

evaluating per block quality using sum of absolute pixel differences for a block, and adjusting a pixel acceptance threshold based on the block quality.

Clause 8: The method of any of clauses 1-7, further comprising:

for each n×n block, determining a quality of motion vector value by performing a sum of absolute pixel difference between a reference input and current input;

for motion vectors that are above a threshold, running a per pixel comparison, and otherwise accepting current results; and applying a Gaussian smoothing filter to a determination of pixel source to smooth transitions between super resolution and non-super resolution regions.

Clause 9: A computing system, comprising:

one or more processors; and a computer-readable storage medium having computer-executable instructions stored thereupon which, when executed by the processor, cause the computing system to perform operations comprising:

receiving a low resolution image frame, a reference super resolution result, and a reference low resolution frame;

computing motion vectors between the low resolution image frame and the reference low resolution frame; and for each pixel in the low resolution image frame:

generating a reference pixel based on the computed motion vectors and the reference low resolution frame; and when the reference pixel is within a position threshold of a corresponding input pixel, rendering a reference super resolution result pixel for a current pixel, and otherwise rendering a corresponding pixel from the low resolution image frame.

Clause 10: The system of clause 9, wherein the motion vectors are computed for width and height.

Clause 11: The system of any of clauses 9 and 10, wherein a location of the reference pixel is determined as differences between x and y values of each pixel and the computed motion vectors.

Clause 12: The system of any clauses 9-11, further comprising computer-executable instructions stored thereupon which, when executed by the processor, cause the computing system to perform operations comprising scheduling a request to update the reference super resolution for the current input by running a machine learning model.

Clause 13: The system of any clauses 9-12, further comprising computer-executable instructions stored thereupon which, when executed by the processor, cause the computing system to perform operations comprising:

learning a color look up table from results of a pure reference frame;

comparing input image and output super resolution image color; and aggregating differences and count per color bucket in order to compute average color difference for each color bucket.

Clause 14: The system of any clauses 9-13, further comprising computer-executable instructions stored thereupon which, when executed by the processor, cause the computing system to perform operations comprising applying a same color delta to input pixels when super resolution pixels are not available for a region of the input frame.

Clause 15: The system of any clauses 9-14, further comprising computer-executable instructions stored thereupon which, when executed by the processor, cause the computing system to perform operations comprising:

evaluating per block quality using sum of absolute pixel differences for a block; and adjusting a pixel acceptance threshold based on the block quality.

Clause 16: The system of any clauses 9-15, further comprising computer-executable instructions stored thereupon which, when executed by the processor, cause the computing system to perform operations comprising:

for each n×n block, determining a quality of motion vector value by performing a sum of absolute pixel difference between a reference input and current input;

for motion vectors that are above a threshold, running a per pixel comparison, and otherwise accepting results; and applying a Gaussian smoothing filter to a determination of pixel source to smooth transitions between super resolution and non-super resolution regions.

Clause 17: A computer-readable storage medium having computer-executable instructions stored thereupon which, when executed by a processor of a computing system, cause the computing system to perform operations comprising:

receiving a low resolution image frame as a current input frame, a reference super resolution result, and a reference low resolution frame;

computing motion vectors between the low resolution image frame and the reference low resolution frame; and for each pixel in the low resolution image frame:

computing a reference pixel based on the computed motion vectors and the reference low resolution frame; and when the reference pixel is within a threshold of a corresponding input pixel, rendering a reference super resolution result pixel for this pixel, and otherwise rendering a corresponding pixel from the current input frame.

Clause 18: The computer-readable storage medium of clause 17, further comprising computer-executable instructions stored thereupon which, when executed by the processor, cause the computing system to perform operations comprising:

learning a color look up table from results of a pure reference frame;

comparing input image and output super resolution image color; and aggregating differences and count per color bucket in order to compute average color difference for each color bucket.

Clause 19: The computer-readable storage medium of any of clauses 17 and 18, further comprising computer-executable instructions stored thereupon which, when executed by the processor, cause the computing system to perform operations comprising applying a same color delta to input pixels when super resolution pixels are not available for a region of the input frame.

Clause 20: The computer-readable storage medium of any of the clauses 17-19, further comprising computer-executable instructions stored thereupon which, when executed by the processor, cause the computing system to perform operations comprising:

evaluating per block quality using sum of absolute pixel differences for a block;

adjusting pixel acceptance threshold based on the block quality;

for each n×n block, determining a quality of motion vector value by performing a sum of absolute pixel difference between reference input and current input;

for motion vectors that are above a threshold, running a per pixel comparison and otherwise accepting results as is; and applying a Gaussian smoothing filter to the determination of pixel source to smooth transitions between super resolution and non-super resolution regions.

What is claimed is:

1. A method of generating super resolution images using a machine learning model and a graphics processing unit, the method comprising:

receiving, by a computing system, a low resolution image frame as a current input frame, a reference super resolution result, and a reference low resolution frame, wherein the reference super resolution result is updated by the machine learning model;

computing, using the graphics processing unit, motion vectors between the current input frame and the reference low resolution frame; and for an input pixel in the current input frame:

determining a position of a reference pixel based on the computed motion vectors computed using the graphics processing unit;

determining that the position of the reference pixel is within a distance threshold of a position of a corresponding input pixel; and based on the determining that the position of the reference pixel is within the distance threshold, rendering a reference super resolution result pixel from the reference super resolution result associated with the input pixel in the current input frame, and otherwise rendering the input pixel in the current input frame.

2. The method of claim 1, wherein the input pixel is a first input pixel, further comprising:

for a second input pixel in the current input frame:

determining a second position of a second reference pixel based on the computed motion vectors;

determining that the second position of the second reference pixel is not within the distance threshold of a position of a corresponding second input pixel; and based on the determining that the second position of the second reference pixel is not within the distance threshold, rendering a corresponding pixel from the current input frame.

3. The method of claim 1, wherein a location of the reference pixel is determined as differences between x and y values of each pixel and the computed motion vectors.

4. The method of claim 1, further comprising scheduling a request to update the reference super resolution result for the current input frame by running the machine learning model.

5. The method of claim 1, further comprising:

learning a color look up table from results of a reference frame;

comparing input image and output super resolution image color; and aggregating differences and count per color bucket in order to compute average color difference for each color bucket.

6. The method of claim 5, further comprising applying a same color delta to input pixels when super resolution pixels are not available for a region of the current input frame.

7. The method of claim 1, further comprising:

evaluating per block quality using sum of absolute pixel differences for a block, and adjusting a pixel acceptance threshold based on the block quality.

8. The method of claim 7, further comprising:

for each n×n block, determining a quality of motion vector value by performing a sum of absolute pixel difference between a reference input and current input;

for motion vectors that are above a threshold, running a per pixel comparison, and otherwise accepting current results; and applying a Gaussian smoothing filter to a determination of pixel source to smooth transitions between super resolution and non-super resolution regions.

9. A computing system, comprising:

one or more processors including a graphics processing unit; and a computer-readable storage medium having computer-executable instructions stored thereupon which, when executed by the processor, cause the computing system to perform operations comprising:

receiving a low resolution image frame, a reference super resolution result, and a reference low resolution frame, wherein the reference super resolution result is updated by a machine learning model;

computing, using the graphics processing unit, motion vectors between the low resolution image frame and the reference low resolution frame; and for each pixel in the low resolution image frame:

generating a reference pixel based on the computed motion vectors computed using the graphics processing unit and the reference low resolution frame; and when the reference pixel is within a position threshold of a corresponding input pixel, rendering a reference super resolution result pixel for a current pixel, and otherwise rendering a corresponding pixel from the low resolution image frame.

10. The computing system of claim 9, wherein the motion vectors are computed for width and height.

11. The computing system of claim 9, wherein a location of the reference pixel is determined as differences between x and y values of each pixel and the computed motion vectors.

12. The computing system of claim 9, further comprising computer-executable instructions stored thereupon which, when executed by the processor, cause the computing system to perform operations comprising scheduling a request to update the reference super resolution result for the low resolution image frame by running the machine learning model.

13. The computing system of claim 9, further comprising computer-executable instructions stored thereupon which, when executed by the processor, cause the computing system to perform operations comprising:

learning a color look up table from results of a pure reference frame;

comparing input image and output super resolution image color; and aggregating differences and count per color bucket in order to compute average color difference for each color bucket.

14. The computing system of claim 13, further comprising computer-executable instructions stored thereupon which, when executed by the processor, cause the computing system to perform operations comprising applying a same color delta to input pixels when super resolution pixels are not available for a region of the low resolution image frame.

15. The computing system of claim 9, further comprising computer-executable instructions stored thereupon which, when executed by the processor, cause the computing system to perform operations comprising:

evaluating per block quality using sum of absolute pixel differences for a block; and adjusting a pixel acceptance threshold based on the block quality.

16. The computing system of claim 15, further comprising computer- executable instructions stored thereupon which, when executed by the processor, cause the computing system to perform operations comprising:

for each n×n block, determining a quality of motion vector value by performing a sum of absolute pixel difference between a reference input and current input;

for motion vectors that are above a threshold, running a per pixel comparison, and otherwise accepting results; and applying a Gaussian smoothing filter to a determination of pixel source to smooth transitions between super resolution and non-super resolution regions.

17. A non-transitory computer-readable storage medium having computer-executable instructions stored thereupon which, when executed by a processor of a computing system, cause the computing system to perform operations comprising:

receiving a low resolution image frame as a current input frame, a reference super resolution result, and a reference low resolution frame, wherein the reference super resolution result is updated by a machine learning model;

computing, using a graphics processing unit, motion vectors between the low resolution image frame and the reference low resolution frame; and for each pixel in the low resolution image frame:

computing a reference pixel based on the computed motion vectors computed using the graphics processing unit and the reference low resolution frame; and when the reference pixel is within a threshold of a corresponding input pixel, rendering a reference super resolution result pixel for each pixel, and otherwise rendering a corresponding pixel from the current input frame.

18. The non-transitory computer-readable storage medium of claim 17, further comprising computer-executable instructions stored thereupon which, when executed by the processor, cause the computing system to perform operations comprising:

learning a color look up table from results of a pure reference frame;

comparing input image and output super resolution image color; and aggregating differences and count per color bucket in order to compute average color difference for each color bucket.

19. The non-transitory computer-readable storage medium of claim 18, further comprising computer-executable instructions stored thereupon which, when executed by the processor, cause the computing system to perform operations comprising applying a same color delta to input pixels when super resolution pixels are not available for a region of the low resolution image frame.

20. The non-transitory computer-readable storage medium of claim 17, further comprising computer-executable instructions stored thereupon which, when executed by the processor, cause the computing system to perform operations comprising:

evaluating per block quality using sum of absolute pixel differences for a block;

adjusting pixel acceptance threshold based on the block quality;

for each n×n block, determining a quality of motion vector value by performing a sum of absolute pixel difference between reference input and current input;

for motion vectors that are above a threshold, running a per pixel comparison and otherwise accepting results as is; and applying a Gaussian smoothing filter to the determination of pixel source to smooth transitions between super resolution and non-super resolution regions.

* * * * *